United States Patent
Lawther et al.

[11] Patent Number: 5,432,573
[45] Date of Patent: Jul. 11, 1995

[54] CAMERA WITH CARTRIDGE HOLDER MOVABLE BETWEEN OPEN AND CLOSED POSITIONS AND MEANS FOR MOVING A FILM CARTRIDGE AT LEAST PART WAY OUT OF THE CARTRIDGE HOLDER

[75] Inventors: Joel S. Lawther, Rochester; Donald P. McGinn, Palmyra, both of N.Y.

[73] Assignee: Eastman Kodak Company, Rochester, N.Y.

[21] Appl. No.: 227,170

[22] Filed: Apr. 14, 1994

[51] Int. Cl.6 .................. G03B 17/02; G03B 17/26
[52] U.S. Cl. ........................ 354/174; 354/275; 354/288; 242/348
[58] Field of Search .......... 354/174, 275, 288; 242/71.1, 348

[56] References Cited

U.S. PATENT DOCUMENTS

| | | | |
|---|---|---|---|
| 3,543,664 | 12/1970 | Kremp et al. | 354/288 |
| 3,672,279 | 6/1972 | Hackenberg et al. | 354/288 |
| 4,095,249 | 6/1978 | Miura | 354/288 |
| 4,363,547 | 12/1982 | Hashimoto et al. | 354/275 X |
| 5,049,914 | 9/1991 | Dassero | 354/288 |
| 5,142,316 | 8/1992 | Tanii et al. | 354/288 X |
| 5,155,514 | 10/1992 | Tamamura | 354/174 |
| 5,159,365 | 10/1992 | Takahashi et al. | 354/275 X |
| 5,323,201 | 6/1994 | Richiuso et al. | 354/288 |

FOREIGN PATENT DOCUMENTS

| | | |
|---|---|---|
| 4230524A1 | 3/1993 | Germany . |
| 57-32435 | 2/1982 | Japan . |
| 4-80735 | 3/1992 | Japan . |

*Primary Examiner*—Michael L. Gellner
*Assistant Examiner*—J. K. Han
*Attorney, Agent, or Firm*—David A. Howley

[57] ABSTRACT

A camera includes a camera body and a cartridge holder having an opening through which the cartridge holder receives a film cartridge. The cartridge holder is movable between a closed position in which the opening is covered by a portion of the camera body and an open position in which the opening is not covered by the portion of the camera body. A film cartridge in the cartridge holder is automatically moved at least part way out of the cartridge holder when the cartridge holder is moved from the closed position to the open position.

6 Claims, 9 Drawing Sheets

CAMERA WITH CARTRIDGE HOLDER MOVABLE BETWEEN OPEN AND CLOSED POSITIONS AND MEANS FOR MOVING A FILM CARTRIDGE AT LEAST PART WAY OUT OF THE CARTRIDGE HOLDER

CROSS-REFERENCE TO RELATED APPLICATION

Reference is made to commonly assigned copending application Ser. No. 08/075,969, entitled Apparatus For Controlling the Movement of a Film Cartridge From a Cartridge holder in a Camera and filed Jun. 11, 1993 in the names of Lawther et al.

1. Field of the Invention

The invention relates generally to the field of photography, and in particular to cameras. More specifically, the invention relates to a camera cartridge holder movable between open and closed positions and means for moving a film cartridge in the cartridge holder at least part way out of the cartridge holder.

2. Background of the Invention

U.S. Pat. No. 5,142,316 ('316) entitled Photographic Camera and issued on Aug. 25, 1992 discloses a camera having a cartridge holder 14 pivotably supported by a shaft 14a for movement between an open position in which the holder projects transversely from the camera body and an accommodation or closed position in which the holder stands vertically in the camera body. Cut-outs 12e and 12f are formed on the front and rear walls of the holder so that a film cartridge 5 can be caught with a person's fingers. A leaf spring 15 urges the cartridge toward a direction perpendicular to the axis of a film spool 5a. The cartridge holder is urged towards the open position. A locking lever 16 is coupled with a knob 16c exposed to the exterior of the camera body. A pin 14b is unlocked from the locking lever by operating the knob. As a result, the cartridge holder is allowed to pivot toward the open position.

A problem with the cartridge holder disclosed in the '316 patent is that no structure is provided for moving the film cartridge in the cartridge holder at least part way out of the cartridge holder when the cartridge holder is in the open position. As such, when the cartridge holder is in the open position, there is a limited amount of the film cartridge exposed for grabbing with human fingers, resulting in difficulty in removing the cartridge from the cartridge holder. This situation is further aggravated by leaf spring 15 which provides resistance to removal of the film cartridge from the cartridge holder.

SUMMARY OF THE INVENTION

The present invention is directed to overcoming one or more of the problems set forth above. Briefly summarized, according to one aspect of the present invention, a camera includes a camera body and a cartridge holder having an opening through which the cartridge holder receives a film cartridge. The cartridge holder is movable between a closed position in which the opening is covered by a portion of the camera body and an open position in which the opening is not covered by the portion of the camera body. Structure in the camera causes a film cartridge in the cartridge holder to be moved at least part way out of the cartridge holder.

By moving the film cartridge in the cartridge holder at least part way out of the cartridge holder, the film cartridge is easily graspable by human fingers, thereby facilitating easy removal of the film cartridge from the cartridge holder.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Figure 1:
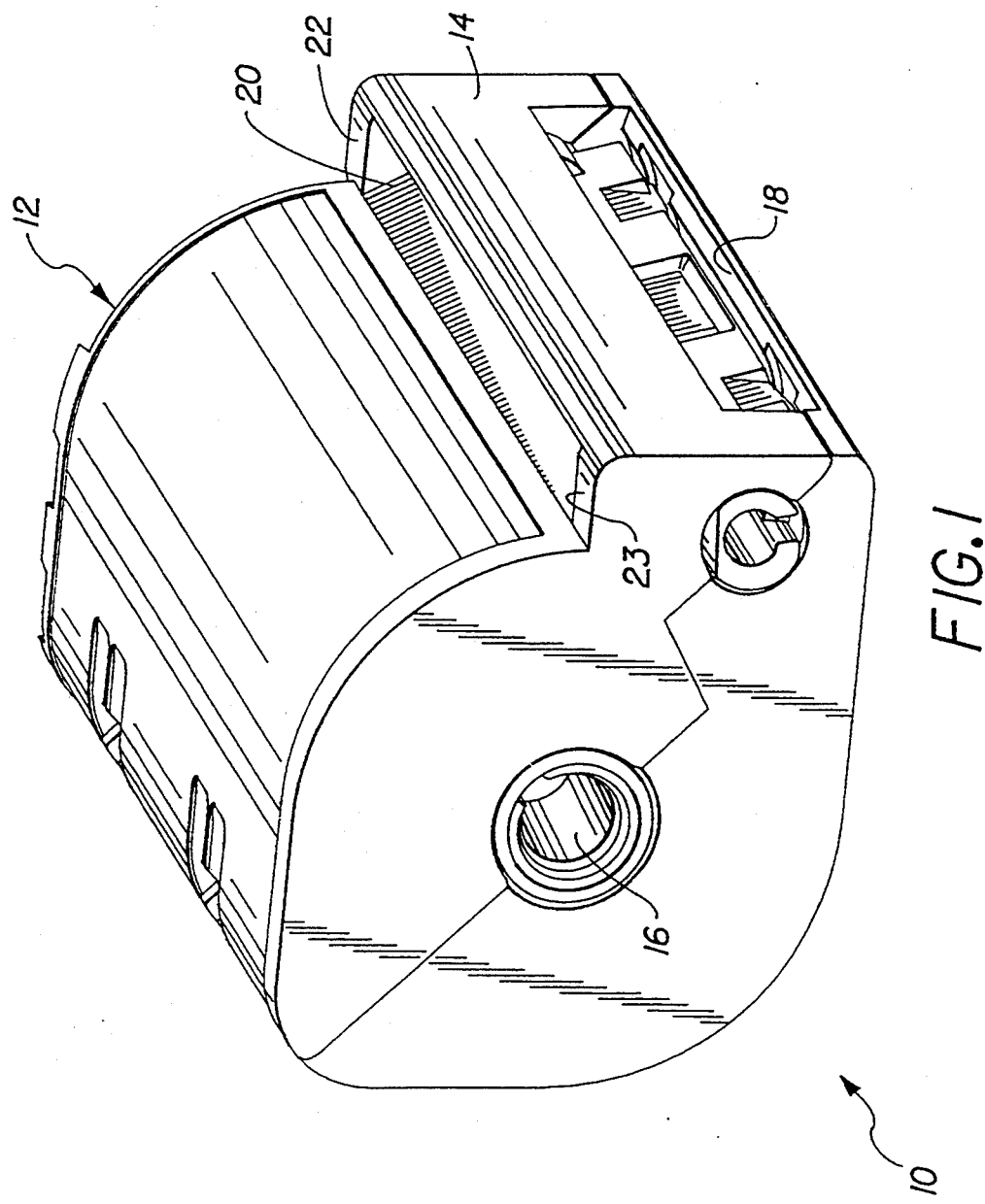
FIG. 1 is a perspective view of a photographic film cartridge.

Referring now to the drawings, FIG. 1 shows a film cartridge generally designated by the reference numeral 10. The film cartridge is preferably made of a material such as plastic and includes a housing 12 having a lip 14. A spool 16 is rotatably mounted inside the housing. Wrapped on the spool is a photographic filmstrip (not shown) which can be thrust through an opening 18 in lip 14. A groove 20 is located on an inner surface 22 of lip 14. The groove is preferably parallel with spool 16 and extends a substantial portion of the length of lip 14. One end of the groove is defined by a portion 23 of lip 14.

Figure 2:
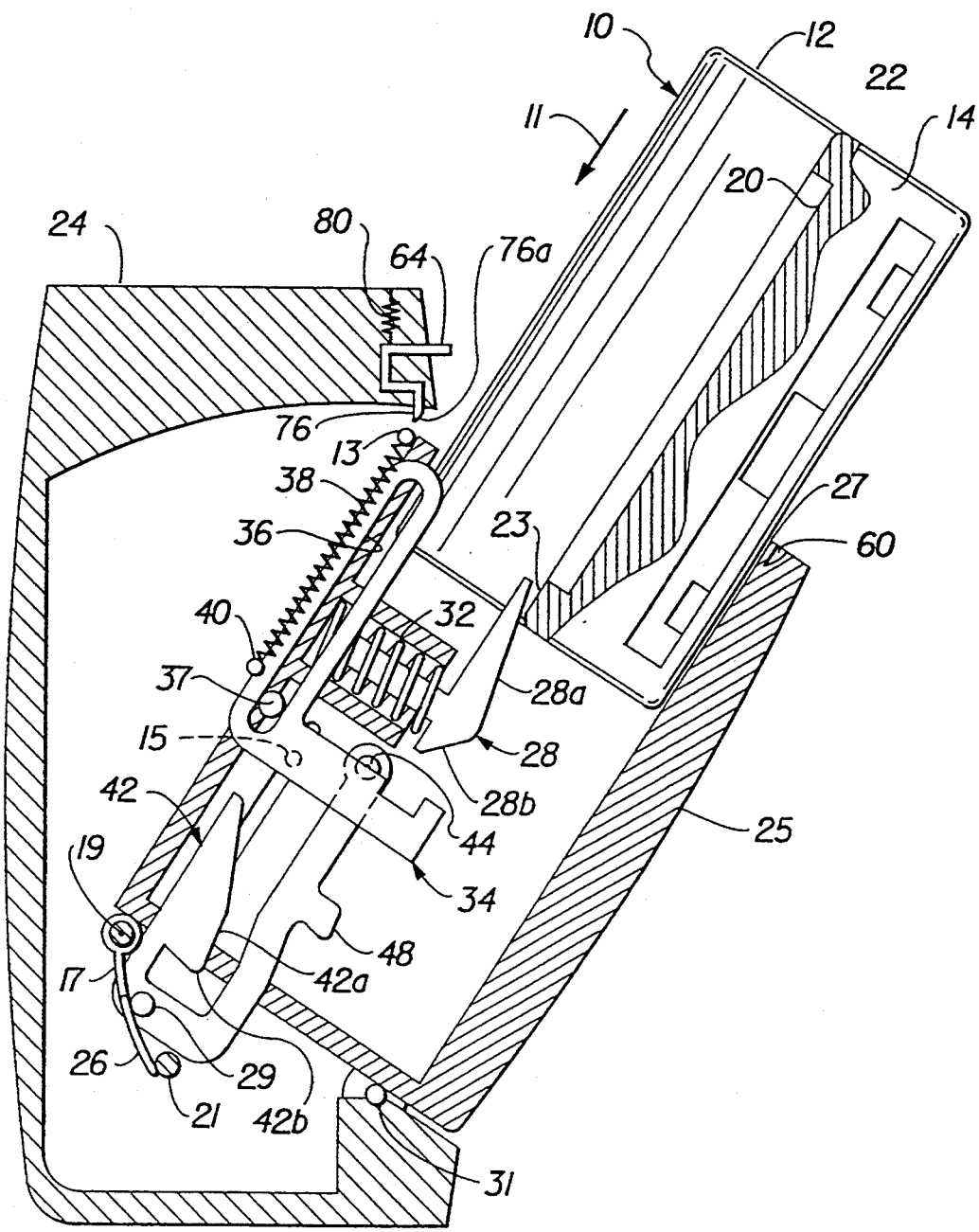
FIGS. 2–9 are side schematic views representing a camera loading chamber and a film cartridge.

Turning now to FIG. 2, there is shown a portion of a camera body designated generally by the reference numeral 24. A cartridge holder 25 includes an opening 27 to receive and discharge film cartridge 10 end first. Cartridge holder 25 is shown in an open position in which opening 27 is not covered by portion 24 of the camera body. A camera operator inserts the cartridge end first into the cartridge holder along the direction of arrow 11. It should be noted that in FIGS. 2–9 a portion of lip 14 has been removed to facilitate viewing of groove 20.

Figure 3:
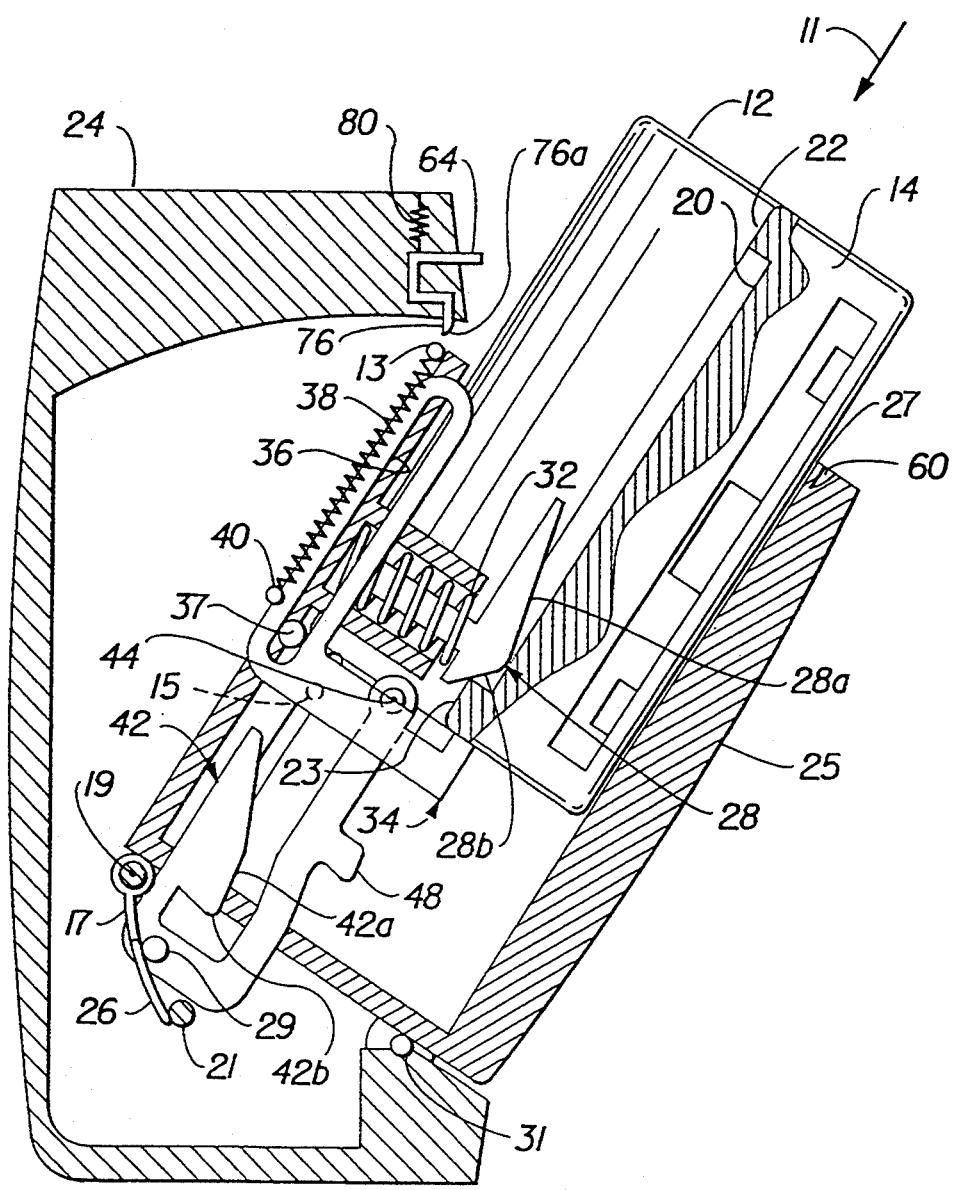

In FIG. 3 the film cartridge has been inserted a substantial distance into the cartridge holder by the camera operator. As the film cartridge is lowered into the cartridge holder, portion 23 of lip 14 engages a retention member 28. The retention member has a pair of inclined surfaces 28a and 28b and is moveable in the direction of arrow 30. Further, retention member 28 is connected to a compression spring 32. As the film cartridge is further lowered into the cartridge holder, portion 23 of lip 14 presses against surface 28a of the retention member, causing retention member 28 to move in the direction of arrow 30. As the film cartridge is lowered further, portion 23 rides past retention member 28. Retention member 28 is then urged in a direction opposite to arrow 30 by spring 32 such that the retention member engages or is inserted into groove 20 of film cartridge 10.

A trigger arm 17, rotatably secured to the camera body at a pivot point 19, is biased in a counterclockwise direction by a torsion spring (not shown) located at pivot point 19. Trigger arm 17 is held against a stop 21, also secured to the camera body, by the torsion spring. Trigger arm 17 also includes a rib portion 26 which extends further into the drawing than the rest of the trigger arm. A pin 29 rests against and rides along rib 26.

Figure 4:
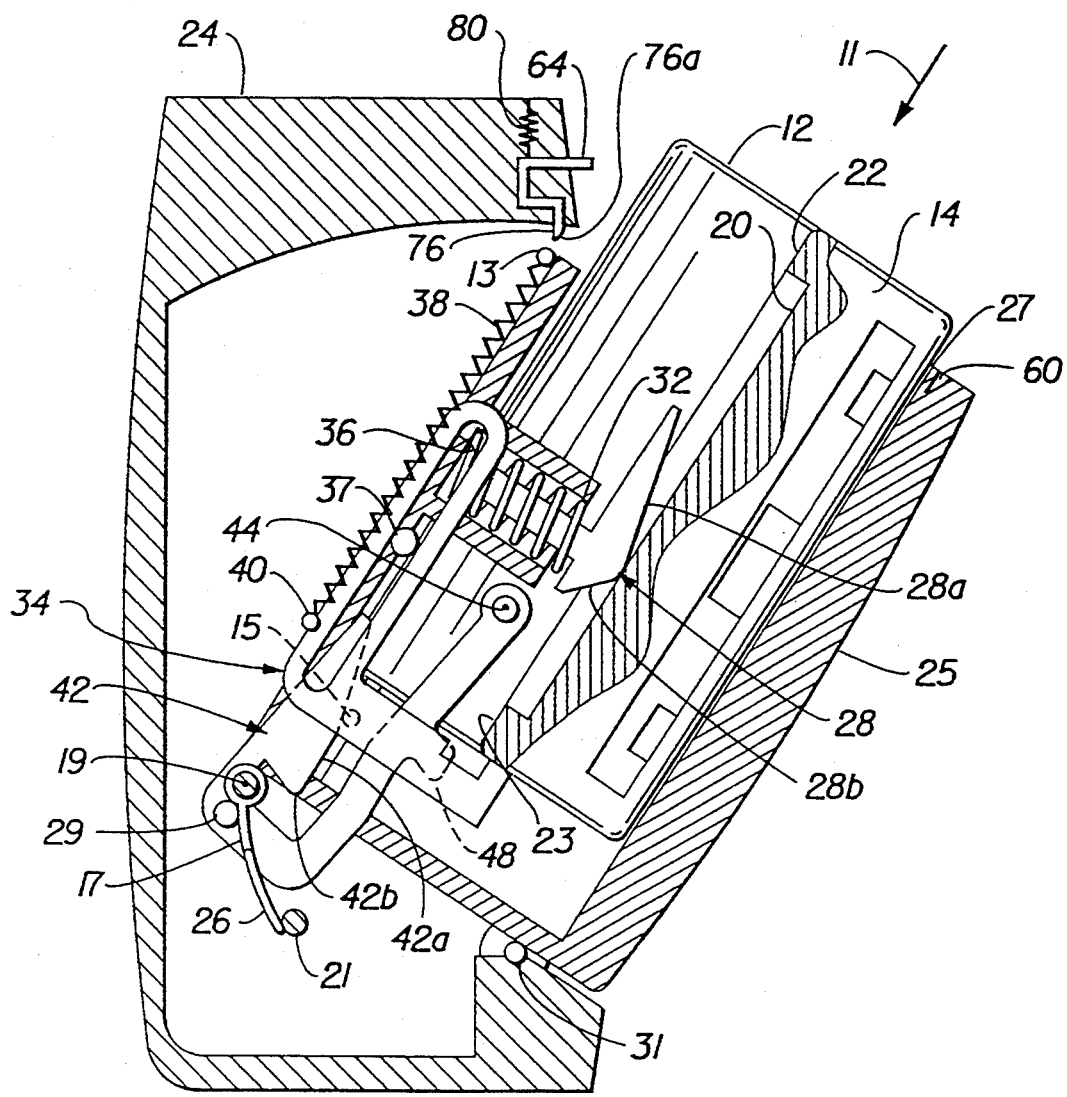

Turning now to FIG. 4, as the film cartridge is lowered into the cartridge holder, one end of the cartridge contacts an elevator 34. The elevator moves in the direction of arrow 11 and is guided by a pin 37 which rides in a slot 36 located in the elevator. A tension spring 38 is connected at one end to the elevator at a pin 40. The other end of the spring is connected to a pin 13 secured to cartridge holder 25. As the cartridge is further lowered, it pushes the elevator in the direction of arrow 11 against the force of spring 38.

As the elevator is lowered, a pin 15, secured to elevator 34 engages a cam surface 42a of lock member 42, causing the lock member to pivot clockwise about a pivot 44 against the force of a torsion spring (not shown) located at pivot 44. The rotation of lock member 42 causes a lock lip 48, which is part of the lock member, to be moved out of the path of portion 23 of cartridge 10. Rotation of lock member 42 also causes pin 29, secured to the lock member, to ride past rib portion 26 of trigger arm 17.

Figure 5:
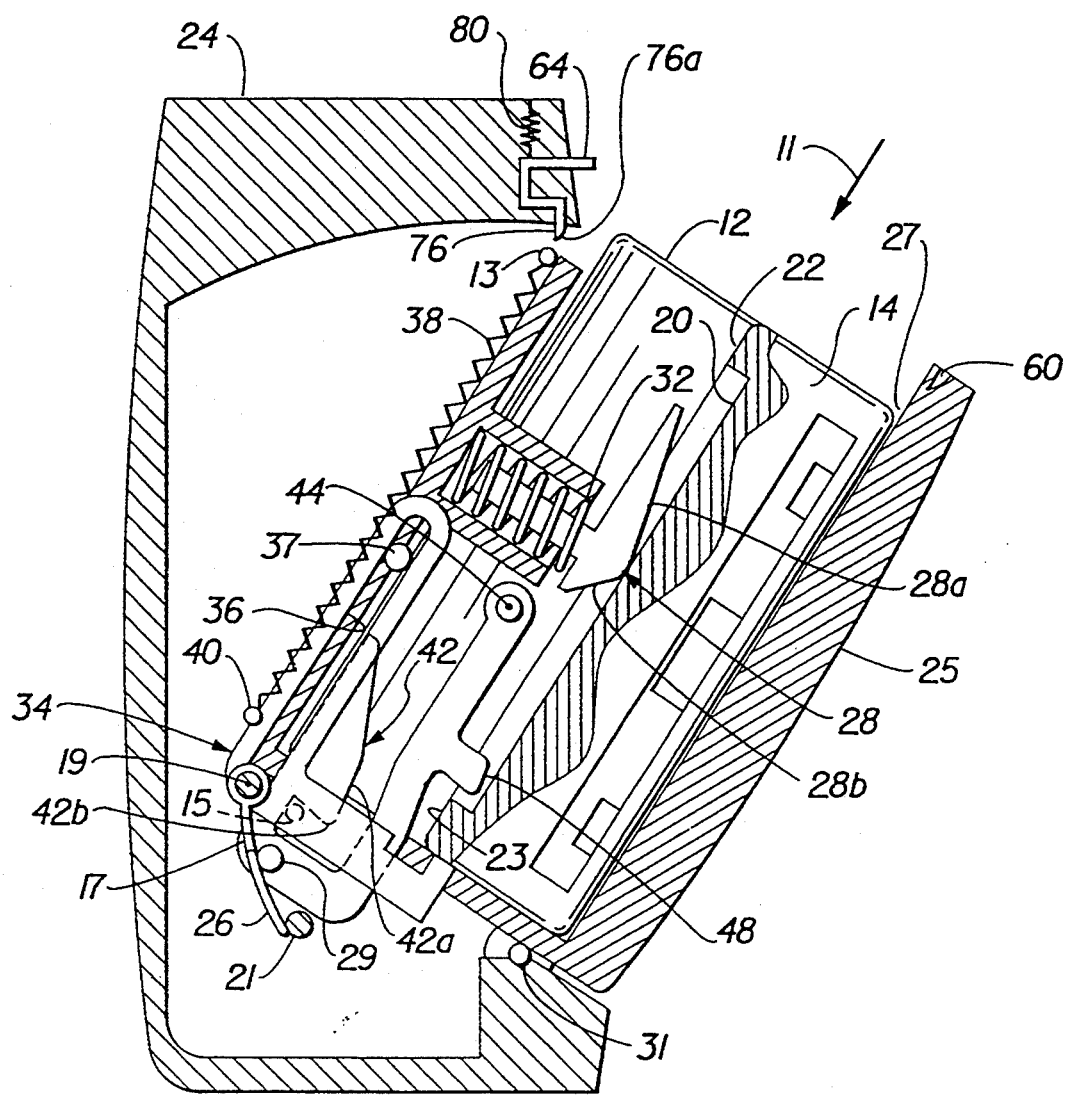

Referring to FIG. 5, the film cartridge has been completely inserted into the cartridge holder. Retention member 28 is engaged into groove 20. Elevator 34 is at its lowermost position. As elevator 34 is moved to its lowest position, pin 15 continues to ride on cam surface 42a of lock member 42. When pin 15 rounds a corner 42b of the lock member, the torsion spring at pivot point 44 returns the lock member to its position shown in FIG. 5. Lock member 42 retains elevator 34 in its lowermost position by preventing pin 15 from moving opposite to the direction of arrow 11. Note that pin 29 on lock member 42 has returned to its position in FIG. 3 adjacent rib portion 26 of trigger arm 17.

Now lock lip 48 is engaged into one end of groove 20. The lock lip prevents the film cartridge from partially falling out of the cartridge holder prior to moving the cartridge holder to a closed position. There is a small space between lock lip 48 and portion 23. Such an arrangement eliminates any force on the cartridge for urging the cartridge out of the cartridge holder prior to moving the cartridge out of the cartridge holder, thereby allowing the film cartridge room to be properly positioned by a film driving mechanism (not shown).

Figure 6:
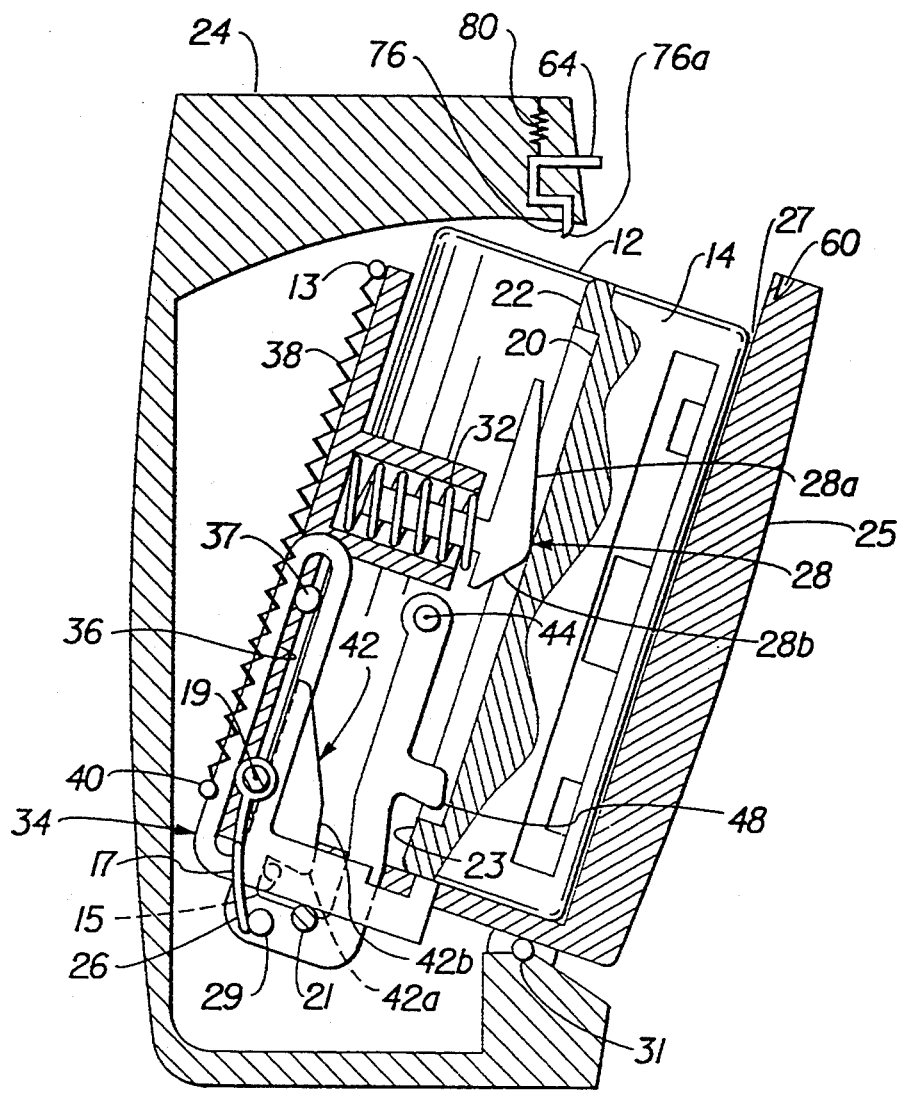

With reference to FIG. 6, once film cartridge 10 is completely loaded into cartridge holder 25, an operator moves the cartridge holder to a closed position by pushing on the cartridge holder. Such pushing causes the cartridge holder to rotate counterclockwise about a pivot point 31 against the force of a torsion spring (not shown) located at pivot point 31 which biases the cartridge holder to its open position. Note that rotation of the cartridge holder to its closed position has caused pin 29 to ride along rib portion 26 of trigger arm 17, thereby rotating trigger arm 17 counterclockwise about pivot point 19 away from stop 21.

Figure 7:
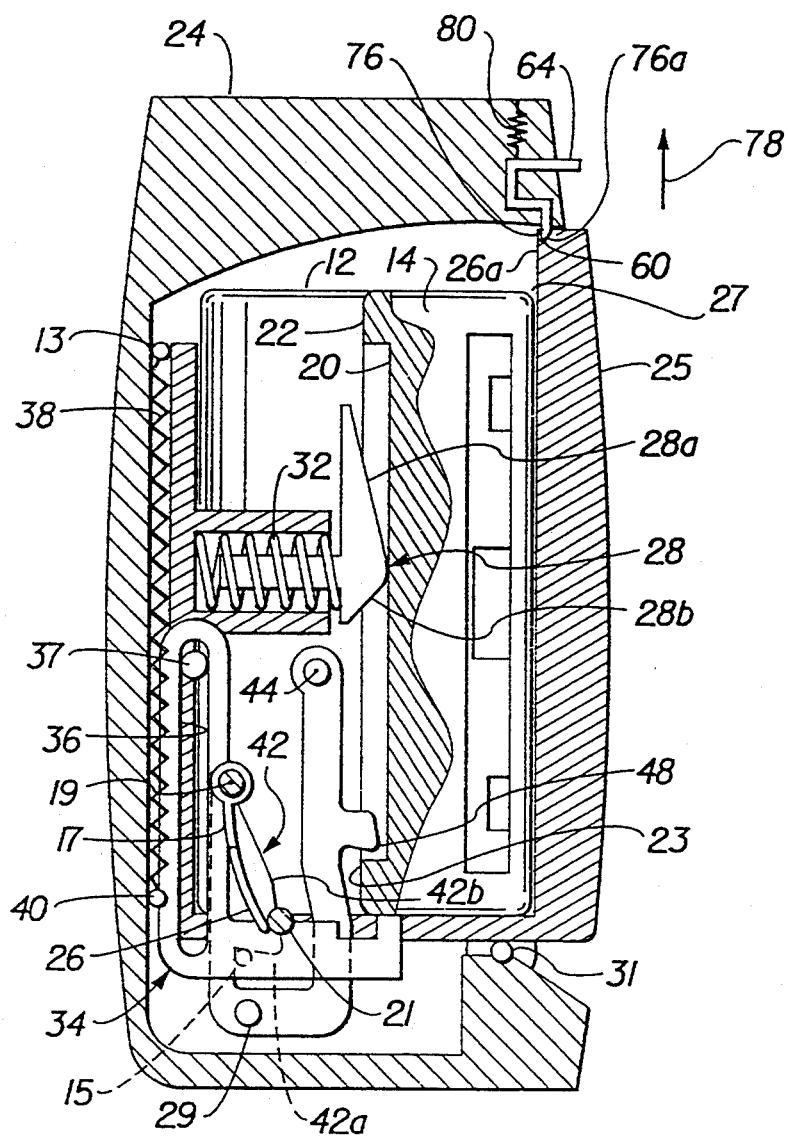

Turning to FIG. 7, as cartridge holder 25 continues to be rotated to a closed position, a surface 26a of the cartridge holder contacts an inclined surface 76a of a latch 76. This contact causes the latch to be moved in the direction of an arrow 78 against the force of a compression spring 80, allowing the cartridge holder to swing past the latch. When cartridge holder 25 is completely in the closed position, latch 76 is returned to its original position by spring 80 where the latch engages into a recess 60 in the cartridge holder. Consequently, cartridge holder 25 is retained in the closed position. Note that pin 29 has ridden past rib portion 26 of trigger arm 17, thereby allowing the torsion spring at pivot point 19 to rotate trigger arm 17 counterclockwise against stop 21.

Figure 8:
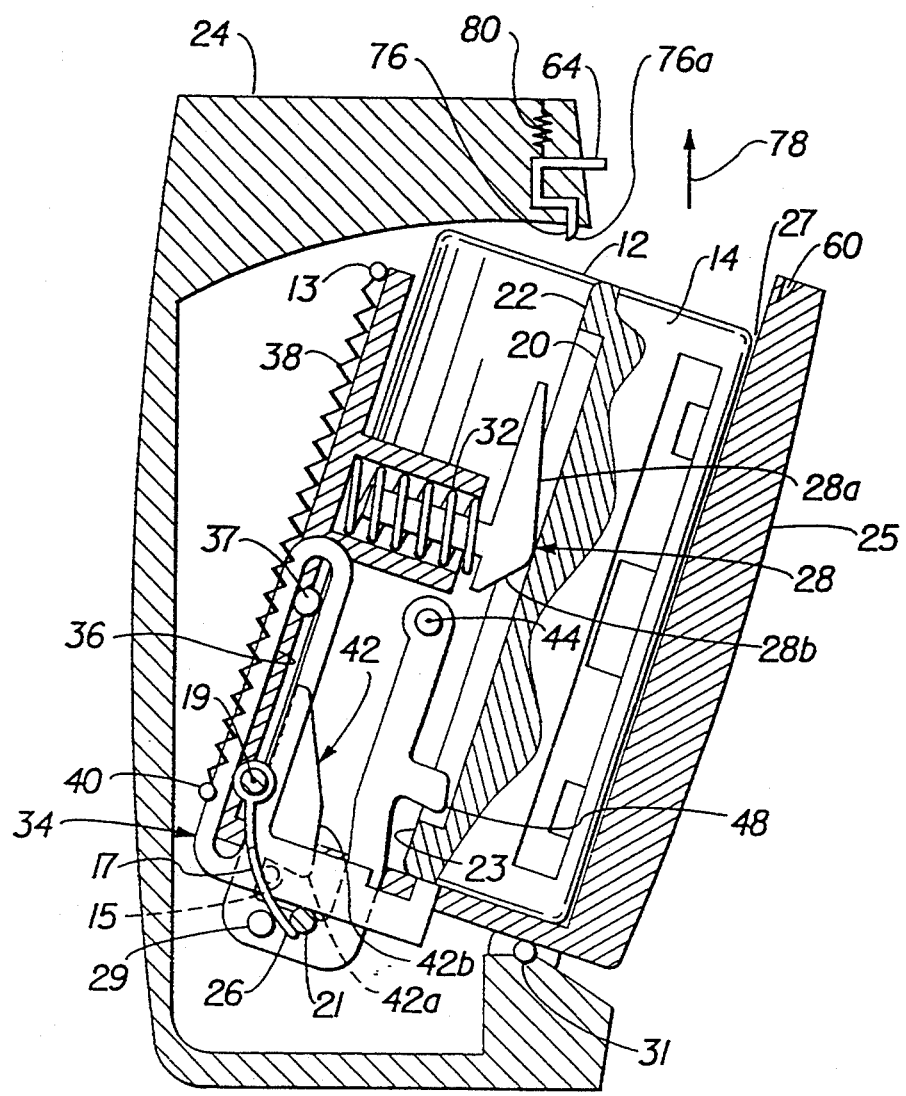

With reference to FIG. 8, when it is desired to remove the film cartridge from the cartridge holder, an operator moves a knob 64, connected to latch 76, in the direction of arrow 78. Such movement of knob 64 causes latch 76 to be moved in the direction of arrow 78, disengaging the latch from recess 60 in cartridge holder 25. Cartridge holder 25 now rotates toward the open position under the influence of the torsion spring located at pivot point 30. Pin 29 on lock member 42 has reengaged rib portion 26 of trigger arm 17.

Figure 9:
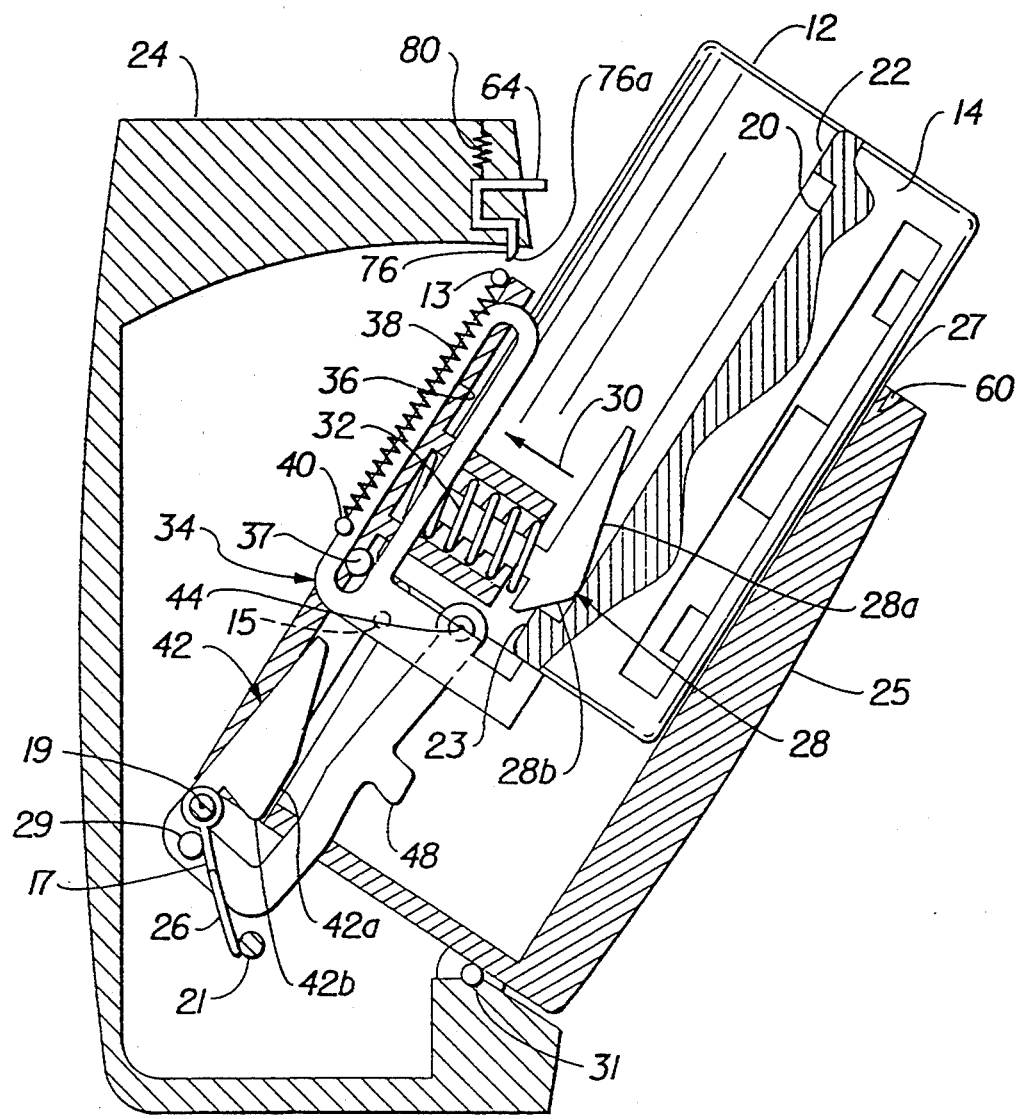

Referring to FIG. 9, as cartridge holder 25 is rotated clockwise towards its open position, pin 29 rides along rib 26, causing lock member 42 to rotate clockwise about pivot point 44. As the lock member rotates, lock lip 4 disengages groove 20 of lip 14. Additionally, pin 15 travels along cam surface 42a around corner 42b. Now, the film cartridge and elevator 34 are no longer retained in the lowermost position in the cartridge holder. Tension spring 38 raises elevator 34 and, consequently, film cartridge 10 such that the film cartridge is moved partially out of the cartridge holder. The film cartridge is now in a position such that it can be easily grasped and removed from the cartridge holder.

It should be noted that the cam profile of all the appropriate surfaces is such that cartridge holder 25 is preferably substantially moved towards the open position before elevator 34 starts to move the film cartridge from the cartridge holder. Consequently, the film cartridge will not bang into the camera body as the film cartridge is moved out of the cartridge holder, thereby preventing jamming of the mechanism and/or damage to the film cartridge and/or camera body.

Lock member 42 returns to its original position, shown in FIG. 2, under the influence of its torsion spring. The film cartridge is prevented from being moved further out of the cartridge holder by the engagement of inclined surface 28b of retention member 28 with portion 23 of lip 14. The retention member can be disabled by grasping the film cartridge and pulling the film cartridge out of the cartridge holder. Such action causes portion 23 of lip 14 to push retaining member 28 in the direction of arrow 30 against the force of spring 32. Once portion 23 has bypassed retention member 28, the retention member is returned to its original position by spring 32. As such, retention member 28 prevents the film cartridge from accidentally falling out of the cartridge holder, thereby preventing damage to the film cartridge.

The invention has been described with reference to a preferred embodiment. However, it will be appreciated that variations and modifications can be effected by a person of ordinary skill in the art without departing from the scope of the invention.

| PARTS LIST FOR FIGS. 1-9 | |
| --- | --- |
| 10 film cartridge | 60 recess |
| 11 arrow | 64 knob |
| 12 housing | 76 latch |
| 13 pin | 76a surface |
| 14 lip | 78 arrow |
| 15 pin | 80 spring |

-continued

| PARTS LIST FOR FIGS. 1-9 |
| --- |
| 16 spool |
| 17 trigger arm |
| 18 opening |
| 19 pivot point |
| 20 groove |
| 21 stop |
| 22 inner surface |
| 23 portion of lip 14 |
| 24 camera body |
| 25 cartridge holder |
| 26 rib portion |
| 26a surface |
| 27 opening |
| 28 retention member |
| 28a inclined surface |
| 28b inclined surface |
| 29 pin |
| 30 arrow |
| 31 pivot point |
| 32 spring |
| 34 elevator |
| 36 slot |
| 37 pin |
| 38 spring |
| 40 pin |
| 42 lock member |
| 42a cam surface |
| 42b corner |
| 44 pivot |
| 48 lock lip |

We claim:

1. A camera, comprising:

a camera body;

a cartridge holder having an opening through which said cartridge holder receives a film cartridge, said cartridge holder being rotatable between a closed position in which said opening is covered by a portion of said camera body and an open position in which said opening is not covered by said portion of said camera body; and means for moving a film cartridge in said cartridge holder at least part way out of said cartridge holder.

2. The camera of claim 1, further comprising:

means for engaging the film cartridge during movement of the film cartridge from the cartridge holder, which allows the film cartridge to be moved at least part way out of the cartridge holder by the moving means but prevents the film cartridge from being completely moved out of the cartridge holder, and which is capable of being disabled to allow the film cartridge to be completely moved out of the cartridge holder.

3. The camera of claim 2, wherein said engaging means includes a spring loaded member which is extendible into a groove located on the film cartridge to contact a portion of the film cartridge at one end of the groove to thereby prevent the film cartridge from moving completely out of the cartridge holder.

4. The camera of claim 1, wherein said moving means automatically moves said film cartridge at least part way out of said cartridge holder.

5. The camera of claim 1, wherein said moving means commences movement of said film cartridge when said opening is not covered by said portion of said camera body.

6. The camera of claim 1, wherein said cartridge holder is formed to receive and discharge the film cartridge end first.

* * * * *